US007199881B2

(12) United States Patent
Martinschledde et al.

(10) Patent No.: US 7,199,881 B2
(45) Date of Patent: Apr. 3, 2007

(54) APPARATUS FOR AND METHOD OF MEASUREMENTS OF COMPONENTS

(75) Inventors: Ludger Martinschledde, Rietberg-Bokel (DE); Guenter Herrmann, Guetersloh (DE); Juergen Eckstein, Versmold (DE); Michael Krauhausen, Aachen (DE)

(73) Assignee: Claas Fertigungstechnik GmbH, Beelen (DE)

( * ) Notice: Subject to any disclaimer, the term of this patent is extended or adjusted under 35 U.S.C. 154(b) by 0 days.

(21) Appl. No.: 11/385,116

(22) Filed: Mar. 21, 2006

(65) Prior Publication Data

US 2006/0158663 A1    Jul. 20, 2006

(51) Int. Cl.
*G01B 11/24* (2006.01)
(52) U.S. Cl. ............... 356/601; 356/606; 356/607; 356/608

(58) Field of Classification Search ................ 356/601, 356/606, 607, 608; 700/245, 259
See application file for complete search history.

(56) References Cited

U.S. PATENT DOCUMENTS

| 4,498,778 | A | * | 2/1985 | White ....................... 356/606 |
| 4,967,370 | A | * | 10/1990 | Stern et al. ................. 700/254 |
| 6,615,112 | B1 | * | 9/2003 | Roos .......................... 700/254 |

* cited by examiner

*Primary Examiner*—Gregory J. Toatley, Jr.
*Assistant Examiner*—Roy M. Punnoose
(74) *Attorney, Agent, or Firm*—Michael J. Striker

(57) ABSTRACT

An arrangement for measuring components has a manipulator, at least one measuring system in operative connection with the manipulator, the at least one measuring system including at least one contour measuring device associated with the manipulator and generating an optical sensing surface sweeping a measuring region, an at least one measuring object arranged in the measuring region and at least one reference feature associated with the measuring object; and a method of measurements is performed with the arrangement.

16 Claims, 3 Drawing Sheets

APPARATUS FOR AND METHOD OF MEASUREMENTS OF COMPONENTS

BACKGROUND OF THE INVENTION

The present invention relates to an apparatus for as well as to a method of measurement of components.

Modern mounting and manufacturing processes increasingly are based on the use of mounting and manufacturing robots, whose actuators are rotatably displaceable in their positions around a plurality of pivot axes for obtaining a high spacial movement flexibility of the robots. The production processes which become more and more complicated post however high demands for the precision of the movement of the robot actuators. The precision of the movement significantly decreases with an increasing number of pivot axes partially. This relationship can be substantially traced to the number of robot components and their component tolerances, as well as to the increasing number of turning axes bearings and their bearing clearances. For providing high-precision movements in such robot systems, they must be partially post-adjusted in defined time intervals by very expensive calibrating processes.

In the past many efforts were made to simplify these calibration processes. The European patent document EP 1 302 285 shows for example such a calibration process, which with the use of complex mathematic relations discloses an efficient and simplest structure calibration process for post-adjusting of robot movements. Based on the complex mathematical relations, such calibration processes are however not suitable to improve the precision of the movement of mounting and manufacturing robots to such a degree that their actuators would be capable for high-precision component measurements.

For performing high-precision component measurements, measuring processes are established, which are performed in so-called measuring spaces under laboratory conditions. In addition to a high time expense for the performance of such measuring processes, they possess the disadvantage that they are integratable in the mounting or manufacturing lines only to a limited degree. In contrast, the robot systems with sensors which can perform high precision measurements are good for the integration in the mounting and manufacturing lines, but such an integration stands in the way of the insufficiently precise movement of the robot segments.

SUMMARY OF THE INVENTION

Accordingly, it is an object of the present invention to provide an arrangement for and a method of measurements of components, which avoids the disadvantages of the prior art.

More particularly, it is an object of the present invention to provide an arrangement for and a method of measurements of components with a robot-guided measuring system, which eliminates the disadvantages of the prior art and provides a great flexibility in the movement of robot systems connected with the measuring accuracy of high precision measuring processes.

In keeping with these objects and with others which will become apparent hereinafter one feature of the present invention resides, briefly stated, in an arrangement for measuring components, comprising a manipulator, at least one measuring system in operative connection with said manipulator, said at least one measuring system including at least one contour measuring device associated with said manipulator and generating an optical sensing surface sweeping a measuring region; and at least one measuring object arranged in said measuring region and at least one reference feature associated with said measuring object.

Another feature of the present invention resides in a method of measuring components with at least one measuring system in operative position with a manipulator, comprising the steps of providing in a measuring region at least one measuring object and a reference feature associated with the measuring object; sweeping the measuring region with a sensing surface which is generated by a contour measuring device of the measuring system that is in operative connection with the manipulator; and determining by the contour measuring device a spatial position of the measuring object relative to the reference feature.

Since in accordance with the present invention at least one contour measuring device is associated with the manipulator and generates an optical sensing surface covering a measuring region, and in the measuring region at least one measuring object and at least one reference feature associated with the measuring object are arranged, it is guaranteed that the determination of the distance and/or the position of the measuring object relative to the reference feature is performed independently from the movement of the manipulator. This has especially the advantage in that the measurement of the measuring object is performed independently from position deviations of the manipulator.

An especially high flexibility of the measurement of the complexly designed component is obtained when in accordance with the present invention the manipulator is formed as a multi-axes handling device, that can drive very flexibly to different component positions.

A structurally simply convertible high-precise measurement of a component is provided in accordance with the present invention when the contour measuring device includes at least one signal source for generation of an optical sensing surface and at least one registering unit which reproduces the intersection region of the sensing surface within measuring region.

In a structurally simple manner, in accordance with the present invention the signal source can be formed as a known laser sensor which operates in accordance with a light section principle.

A structurally simple embodiment of the registering unit is provided when the registering unit in a known manner includes an objective which is in operative position with a detector, wherein the detector detects the section surface provided in the contact zone between the sensing surface and the measuring region, and makes it available as an electronic output signal for further processing.

The sweeping of the measuring region by the sensing surface can be provided in accordance with a further advantageous embodiment of the present invention in a structurally simple way when the control measuring device is movable either linearly or turnable around a horizontal axis on the manipulator.

In a further advantageous embodiment of the present invention the measuring region can be linearly movable, so that the measuring region is guided by a stationary sensing surface generated by a contour measuring device that is arranged stationarily on the manipulator. This has in particular the advantage that the contour measuring device arranged on the turnably movable manipulator can be easily realized, so that the masses movable by the manipulator are reduced.

The flexibility and accuracy of the inventive measuring device can be increased when the measuring device is spatially separated from the manipulator and arranged in any position in space.

In accordance with a further embodiment of the present invention, a plurality of measuring objects with associated reference features are associated with the component. This further increases the efficiency of the component measurement. In an advantageous further embodiment of the present invention, the measuring objects form defined geometries of the component, so that in addition to points, also lines extending in space as well as complete surfaces of the components can be measured.

For determining the distance of the measuring object relative to the reference feature by a simple structural data processing system, the reference features can be embodied by stationary geometrical reference points, whose position and space are stored in the measuring system. The reference points in a structurally simplest case can be formed as suitably shaped geometric bodies, whose position in the measuring region is changeable.

An especially simple, accurate and efficient method for measurement of components is provided when in the measuring region a measuring object and at least one reference feature are arranged, which are swept by a sensing surface, that is generated by a contour measuring device in operative connection with a manipulator, and the control measuring device determines the spatial position of the measuring object relative to the reference feature.

The accuracy of the inventive method is especially high when the manipulator during the measuring process is locked in a stationary position, and the contour measuring device which is in operative connection with the manipulator can change its position relative to the manipulator.

Since the spatial position of the geometry of the measuring object partially or completely is presented in a spatial coordinate system, and the contour measuring device makes the special position as an output signal, these measuring data can be also used for qualitative assessment of the geometry of the measuring object. This is especially of a great advantage when the shape and position deviations of the measuring object must be determined.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
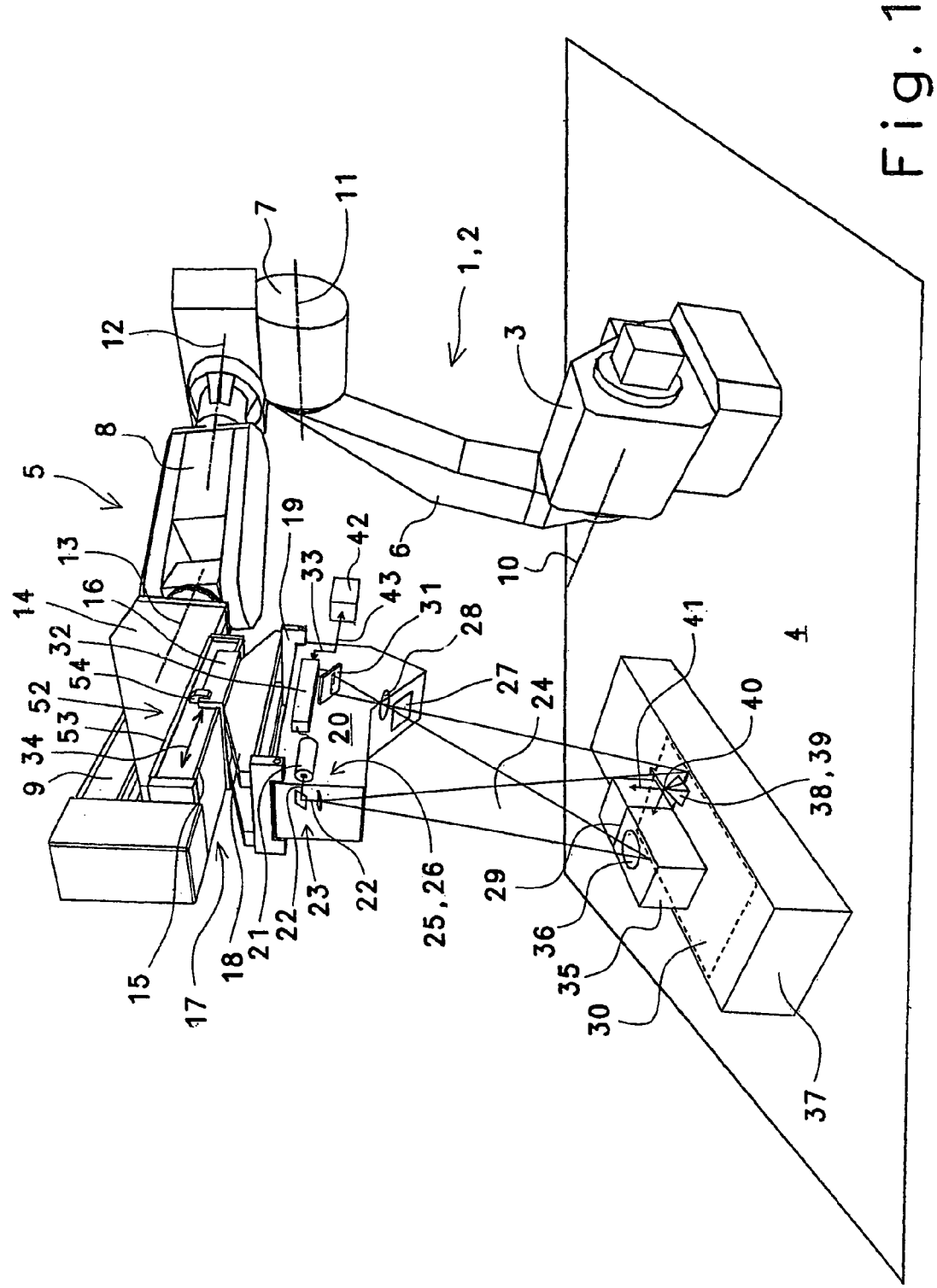
FIG. 1 is a view showing a manipulator of a contour measuring device in accordance with the present invention.

FIG. 1 shows a manipulator 2 which is formed as a mounting and manufacturing robot 1, hereafter referred to as a working robot. It is stationarily anchored at its lower side in a ground 4 through a base 3. Segments 6–9 which form in a known manner the tool carrier 5 are associated with the working robot 1 and movable about a plurality of horizontal and vertical pivot axes 10–13.

In the shown embodiment, the outer segment of the work robot receives a holding device 14 that is designed as a support and has at a lower side a linear guiding system 17 with a guiding rail 15 and a guiding carriage 16 that engages the guiding rail. A holding device 18 which is also formed as a support is associated with the guiding carriage 16 of the linear guiding system 17 in its lower side region. It is fixedly connected with the guiding carriage 17, in a simple case by not shown screws. Further holding devices 18 are formed with an adaptor base 19 in a region facing away from the guiding carriage 16 and in accordance with the present invention receive a contour measuring device 20.

The contour measuring device 20 in a known manner includes a laser beam source 21 with a mirror-lense system 23 which deviates arid splits a laser beam 22, so as to produce a sensing surface 24 in accordance with the present invention. Such a method is known as a laser light section method, and the sensor unit 25 which generates the sensor surface 24 is known as a laser light section sensor 26. In accordance with the present invention, other optical methods can be utilized, which generate either an area sensing field or a point-shaped sensing field. In addition, the control measuring device, in its region facing away from the sensor unit 25, has an objective 28 protected by a view window 27 and detecting the Intersection region 29 between the sensing surface 24 and the measuring region 30 to supply it to a detector 31. The detector 31 reproduces the intersection region 29 and makes it available via an electronic signal unit 22 as output signals 33 for further processing.

In accordance with the present invention, the sensing surface 24 of the contour measuring device sweeps the measuring region 30. The dimension of the measuring region depends on a degree of the fanning of the laser beam 22 in the mirror-laser system 23 in the movement path 34 of the guiding carriage 16 of the linear guiding system 17.

In accordance with the present invention, in the thusly formed measuring region 30 a component 35 is arranged and is provided with at least one measuring object 36 that is located in the measuring region 30 and is swept by the sensing surface 24 of the linearly movable contour measuring device 20. The component 35 schematically shown in FIG. 1 in the simplest case is screwed in a not shown manner in a component carrier 37 or can be fixed in another suitable manner in the component carrier 37. In addition, the component carrier 37 which is spatially separate from the working robot 1, in accordance with the present invention receives a reference feature 38. As shown in FIG. 1, the reference feature 38 can be formed as a pyramid-shaped geometrical body 39 with a head region identified by points and representing a reference point 40 which forms the reference feature 38. In the simplest case the pyramid-shaped geometrical body 39 can be also screwed in the component carrier 37. The position of the body 39 is selected so that the reference feature 38 is associated with at least one measuring object 36 of the component 35 and in some cases located inside the measuring region 30 swept by the sensing surface 24.

The position of the reference feature 38 is determined in a spatial coordinate system 41, and the spatial coordinates are stored in a computing unit 42. Therefore it is possible by means of the contour measuring device 20, to determine distance coordinates and/or space coordinates of the corresponding measuring object 36 associated with the respective reference feature 38, to the reference feature 38. In the simplest case, the space coordinates of the measuring objects 36 are determined in the computing unit 42. It is required here that output signals 33 which code the position of the intersecting region 29 between the measuring region 30, and the sensing surface 24 are made available through a known data transmission systems 43 to the computing unit 42.

Figure 2:
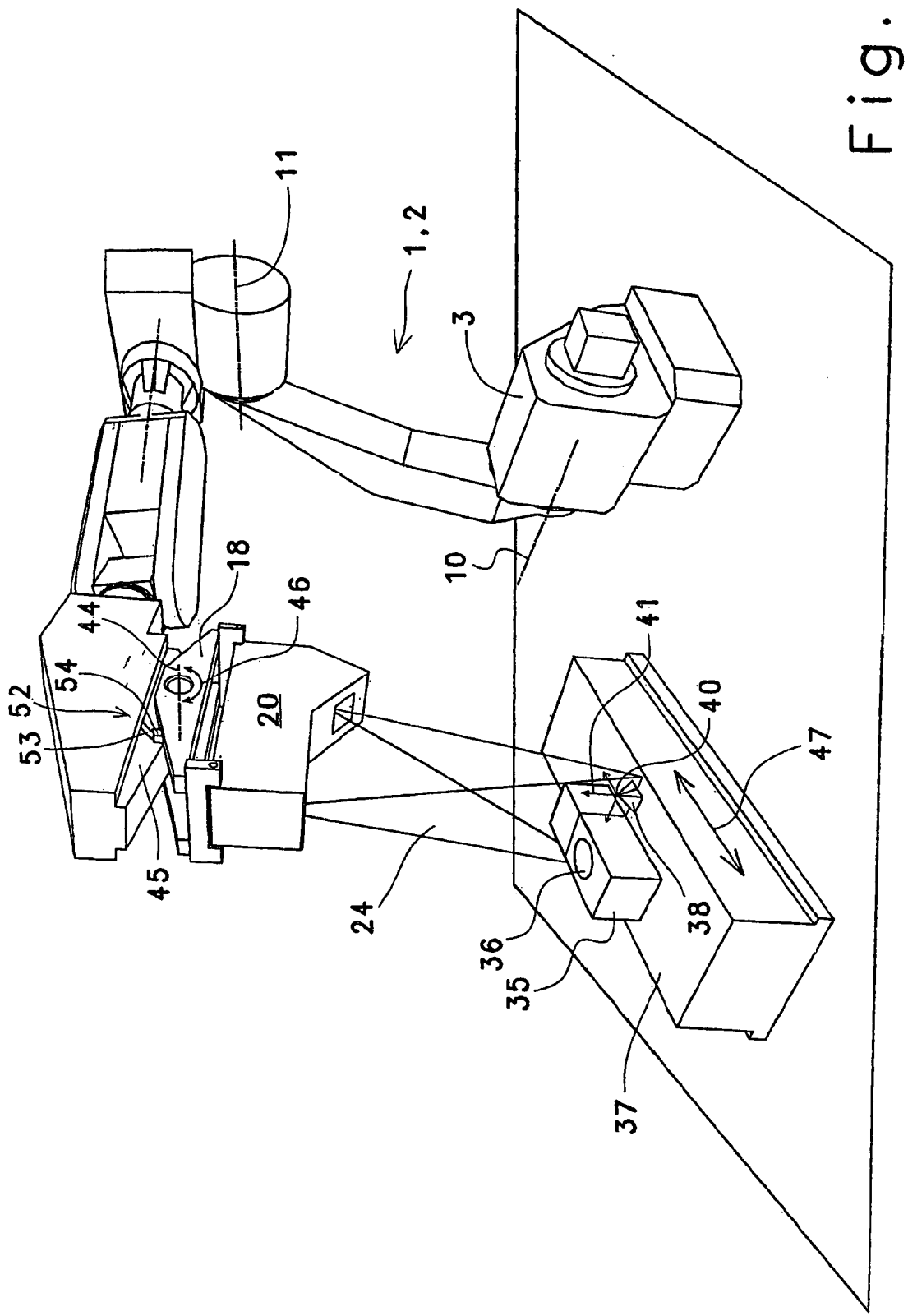
FIG. 2 is a view showing a further embodiment of a manipulator of the inventive contour measuring device.

As shown in FIG. 2 it is also possible that the holding device 18, which receives the contour measuring device 20 at an upper side, also receives a swivel axis 44 that is received by a flange support 45 connected with the front segment 9 of the working robot 1. In a not shown manner, a drive can be provided for turnably guiding the contour measuring device 20 in accordance with the arrow direction 46 around the pivot axis 44. In this case the linear guiding system 17 of FIG. 1 can be dispensed with. It is also recommended to arrange the contour measuring device 20 rigidly on the working robot 1 and to displace the component carrier 37 with the component 35 fixed on it and the reference feature 38 linearly in the arrow direction 47, so that the at least one measuring object 36 of the component 35 and the reference feature 38 associated with the measuring object 36 is guided through the sensing surface 24 of the contour measuring device 20.

For generating high-precision space and/or position coordinates of the measuring object 36 it is required that the position change of the sensing surface 24 is detected by a sensor and transmitted to the computing unit 42. In a known and not described manner, this position change determination can be performed by a path measuring system 52. Depending whether the position of the contour measuring device 20 is changeable by a linear guiding system 17 or a pivot axis 44, scales 53 are associated with the corresponding holding device 18 and formed linearly or circularly. Their not shown markings are detected by position sensors 54 arranged on the moving holding devices 18. The scales 53 are formed as a rule of glass, while the markings as a rule are engraved or milled.

Figure 3:
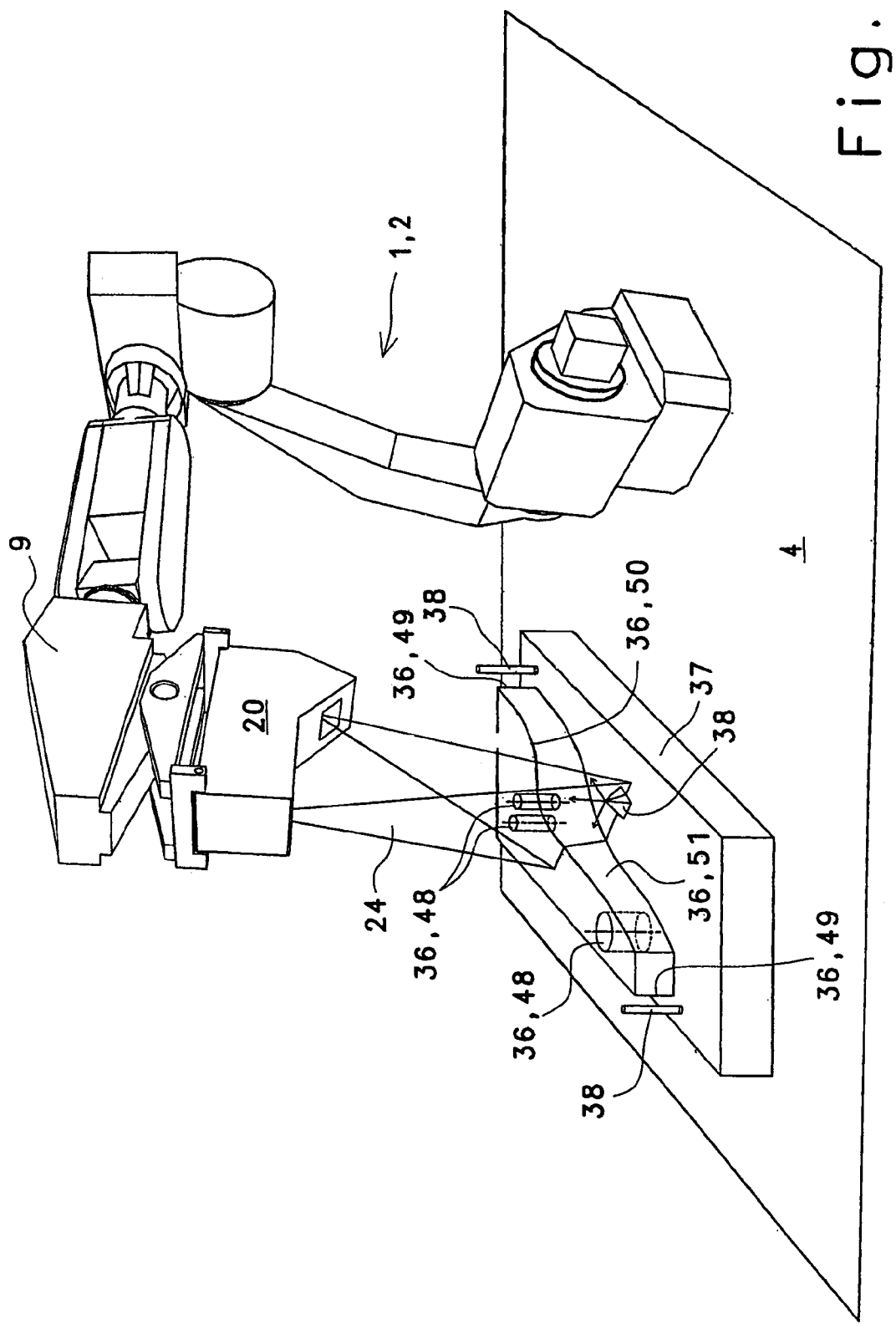
FIG. 3 is a view illustrating the measurement of a component with a complex geometrical structure, in accordance with the present invention.

FIG. 3 shows a further embodiment of the inventive arrangement schematically shown in FIGS. 1 and 2. The component carrier 37 is fixed on the ground 4 and at the same time is arranged independently from the manipulator 2 formed as a working robot 1. The component carrier has a plurality of bar-shaped reference features 38. They are arranged in a fixed position on the component carrier 37 and associated with a plurality of measuring objects 36. Because of the complex shape of the component 35, the reference features 38 have different positions in space. For measuring the measuring objects 36 and the reference features 38 associated with them by the contour measuring device 20, the front segment 9 of the working robot 1 must be brought to different positions. The corresponding required position is determined by the position of the measuring object 36 and the reference feature 38 associated with it, since it always must be guaranteed that the sensing surface 24 of the contour measuring device 20 sweeps at least the associated measuring object 36 and the reference feature 38 in the previously described manner.

As can be seen from FIG. 3, the measuring objects to be measured can have different geometries. The measuring objects on the one hand can have simple geometries in form of openings 48, or can have rectilinear edge dimensions 49. Because of the high precision of such laser-based contour measuring devices 20, it is however possible that the measuring objects 26 have complicated geometrical shapes, such as for example three-dimensional curvatures of edges 50 or surfaces 51 extending in space. In addition, the inventive method makes possible a testing of so-called shape and position tolerances of different measuring objects 36 relative to one another, such as the coincidence of openings 48, through which for example a common pivot axis must pass. A further advantageous utilization of the method includes testing of the position and shape of welding seams, that can be tested with the use of the inventive method in running mounting or manufacturing processes, without the use of complicated measuring processes oriented specially for measurements of the welding seams.

It will be understood that each of the elements described above, or two or more together, may also find a useful application in other types of constructions differing from the types described above.

While the invention has been illustrated and described as embodied in an apparatus for and method of measurements of components, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for measuring components, comprising a manipulator; at least one measuring system in operative connection with said manipulator, said at least one measuring system including at least one contour measuring device associated with said manipulator and generating an optical sensing surface sweeping a measuring region; an at least one measuring object arranged in said measuring region and at least one reference feature associated with said measuring object, wherein said contour measuring device is arranged on said manipulator so as to be linearly movable.

2. An arrangement as defined in claim 1, wherein said manipulator is formed as a multi-axes working robot.

3. An arrangement as defined in claim 1, wherein said contour measuring device has at least one signal source for generation of said optical sensing surface and at least one registering unit which reproduces an intersecting region of said sensing surface with said measuring region.

4. An arrangement as defined in claim 3, wherein said signal source is formed as a laser sensor.

5. An arrangement as defined in claim 4, wherein said laser sensor is formed as a laser light section sensor.

6. An arrangement as defined in claim 3, wherein said registering unit includes a detector and an objective which is in operative connection with said detector, said detector detecting said intersecting region and making it available as an electronic output signal for a further processing.

7. An arrangement as defined in claim 1; and further comprising a component carrier provided for receiving the component and being linearly movable.

8. An arrangement as defined in claim 1, wherein said measuring region is arranged spatially separate from said manipulator and occupies an arbitrary position in space.

9. An arrangement as defined in claim 1, wherein a plurality of said measuring objects and a plurality of said associated reference features are arranged on the component.

10. An arrangement as defined in claim 1, wherein said measuring object forms a defined geometry of a component.

11. An arrangement as defined in claim 1, wherein said reference feature incorporates a stationary geometric reference point; and further comprising a computing unit which stores said reference point in its position in space.

12. An arrangement as defined in claim 1, wherein said reference feature is formed as a geometrical body with a position changeable in said measuring region.

13. A method of measuring components with at least one measuring system in operative connection with a manipulator, comprising the steps of providing in a measuring region at least one measuring object and a reference feature associated with the measuring object; sweeping the measuring region with a sensing surface which is generated by a contour measuring device of the measuring system that is in operative connection with the manipulator; determining by the contour measuring device a spatial position of the measuring object relative to the reference feature; and retaining the manipulator during a measuring process in an immovable position and changing a position of the contour measuring device relative to the manipulator with which it is in the operative connection and using an output signal of the contour measuring device for measuring the component.

14. A method as defined in claim 13; and further comprising representing a spatial position of a geometry of the measuring object at least partially in a spatial coordinate system; and making the spatial position available by the contour measuring device as an output signal.

15. A method as defined in claim 13; and further comprising using a spatial position of the measuring object for a qualitative assessment of a geometry of the measuring object.

16. A method as defined in claim 15; and further comprising providing in the qualitative assessment a determination of shape and position deviations.

\* \* \* \* \*